UNITED STATES PATENT OFFICE.

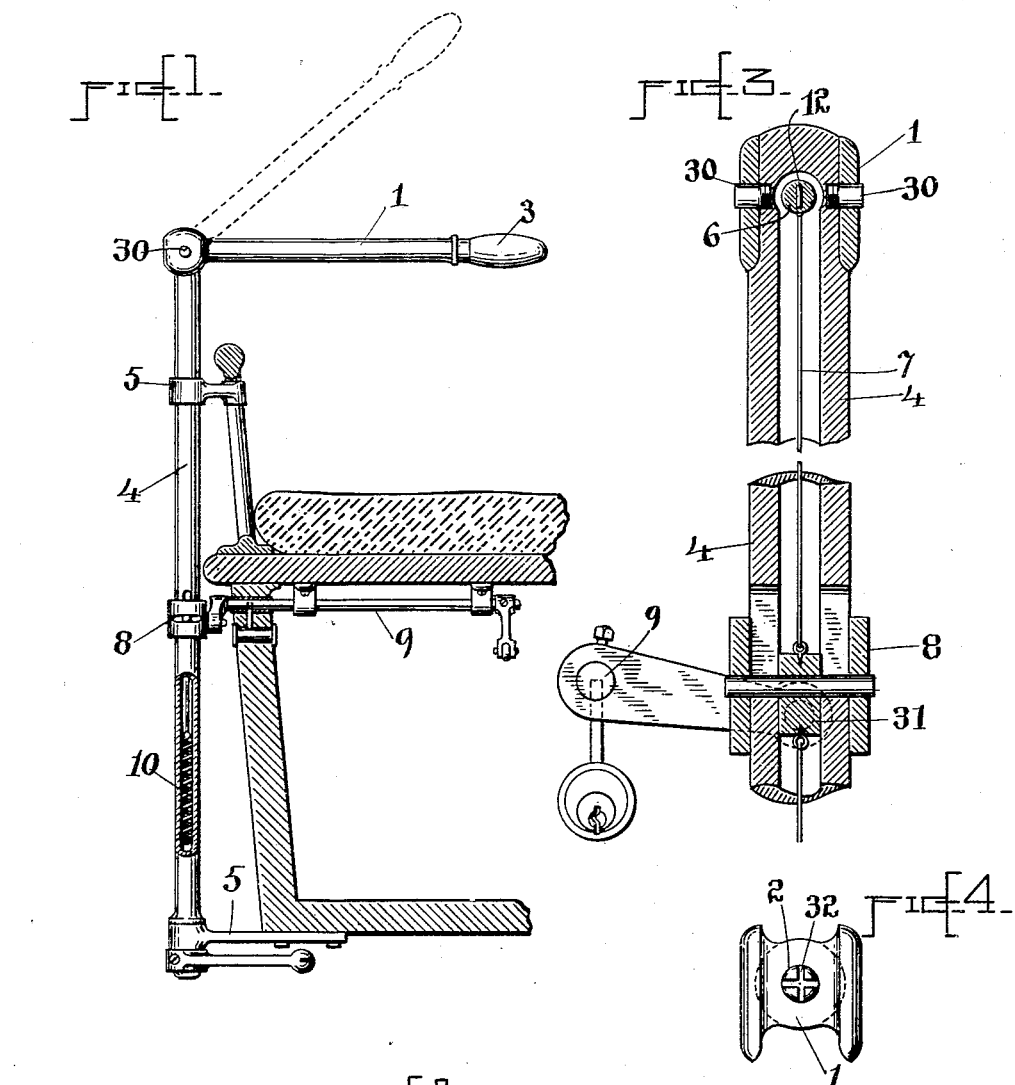

MAJOR DANE PORTER, OF NEW YORK, N. Y., ASSIGNOR TO CLARENCE F. JEWETT, TRUSTEE, OF NEW YORK, N. Y.

STEERING AND CONTROLLING DEVICE FOR ROAD-VEHICLES.

SPECIFICATION forming part of Letters Patent No. 704,102, dated July 8, 1902.

Application filed February 11, 1902. Serial No. 93,590. (No model.)

*To all whom it may concern:*

Be it known that I, MAJOR DANE PORTER, a citizen of the United States, and a resident of New York city, in the county of New York and State of New York, have invented certain new and useful Improvements in Mechanisms for Steering and Controlling the Power of Road-Vehicles, of which the following is a specification.

My invention relates to mechanism for steering and for controlling the power in a road-vehicle driven by steam or other power, and more particularly to mechanisms organized in such manner that the power may be controlled by the manipulation of the same handle which is used for steering the vehicle.

The main object of my invention is to produce a simple and effective mechanism which shall act automatically to cut off power when the handle is released by the driver.

To this end my invention consists in the novel features of construction and combinations of parts hereinafter described, and more particularly specified in the claims.

In the accompanying drawings, Figure 1 is a general elevation and partial section of mechanism embodying my invention. Fig. 2 is a longitudinal cross-section through the lever carrying the handle. Fig. 3 is a vertical section through the vertical transmission-rod. Fig. 4 is a detail showing a rod of the device in end view.

In the drawings, 1 indicates a steering lever or arm formed, preferably, as a hollow piece of metal to permit it to carry in its interior a shaft or rod 2, which shall be capable of rotation within said arm.

3 is a grip attached to the rod 2 and adapted to rotate the same and also to swing the lever 1, so as to impart rotation to the hollow vertical transmission-rod or rock-shaft 4, with which the lever 1 is connected by a swivel or pivotal connection 30, as clearly shown in Fig. 2, thus permitting the handle or lever 1 to be thrown up out of the way when the operator wishes to leave his seat.

The vertical rod or bar 4 may be supported in suitable brackets 5, attached to the body of the vehicle, as indicated, or may be otherwise mounted or supported and connected with the handle, as well understood in the art. At its lower end the rod 4 connects in any suitable manner with the steering mechanism, as well understood in the art. At the end opposite the grip 3 the rod or bar 2 is connected with or carries a rotatable spool or block 6, rotatable in suitable bearings at the upper end or head of the vertical steering-rod 4, as shown more clearly in the sectional view Fig. 2.

The spool or block 6 has attached to it a cord 7, as more clearly shown in Fig. 3, which cord runs down through the hollow bar 4 and is connected with a sleeve or block 8, adapted to ride upon the bar or rod 4 and to move up and down thereon.

The block or sleeve 8 is connected with a rock-shaft 9 or any other suitable mechanism adapted to communicate motion to the throttle-valve or other means for controlling the power of the vehicle.

The cord 7 may be connected with the sleeve 8 by means of a pin which at its ends is secured to the sleeve and passes transversely through the rod 4, which latter is suitably slotted to permit the vertical movement of the pin and sleeve. The cord 7 is attached to a block 31 at the center of the pin, and there is also connected to said block a spring 10, whose function is to draw the lever 8 down and to move the parts into position where the power will be shut off when the grip 3 is released. In this position of the parts the cord 7 and spool 6 assume the position indicated in Fig. 3; but by twisting the grip the cord 7 will be wound up upon the block 6 and the block or sleeve 8 will be raised, thus operating the mechanism or device 9, by which the throttle or other power-controller is operated.

In order to permit the lever 1 to be thrown up out of the way, a suitable automatic coupler is provided between the interior rod 2 and the rotatable block 6. For this purpose the inner end of the rod 2 is provided with one or more slots 32, as indicated in the end view of the rod, Fig. 4, which are adapted to receive the coupling plate or dog 12, which is seated in the end of the block 6 and is provided with a suitable spring 13, which tends to force said plate outwardly into one of the slots in the end of the bar 2. When the plate is engaged with one of said slots, it is obvious that the twisting of the grip 3 will impart movement to the block or spool 6.

When the grip is released, the cord 7, actuated by its spring 10, brings the parts into position such that the plate 12 will stand in a vertically line, permitting the lever 1 to be swung upward vertically, as already explained. When the lever 1 is thrown down again, the rod 2 and the spool 6 will become coupled, so that the twisting of the grip 3 will rotate the spool and turn on the power, or if the grip 3 has been disarranged then a turning movement of the same will bring the slot in the end of the part 2 into such position that the plate or dog 12 may enter the slot and allow the lever 1 to be thrown down into normal position.

What I claim as my invention is—

1. In an automatic controlling and steering mechanism for vehicles, the combination substantially as described of the vertical transmission rock-shaft, the steering-arm pivotally connected to the head thereof, a grip connected to a rod or bar rotatable in or on said arm, a spool or block rotatable in bearings in the head of the vertical transmission-shaft, means for detachably connecting said spool and rotatable rod and power-controlling mechanism having intermediate connections with said spool to permit the power to be turned on or off by the rotation of the spool or block.

2. In an automatic controlling and steering mechanism for vehicles, the combination substantially as described with the vertical transmission rock-shaft connected with the steering mechanism, of a block or sleeve adapted to move vertically thereon and connected with the throttle or other power-controlling device, a spool or block rotatable in bearings on the head of the vertical rod or bar, a cord adapted to be wound thereon and connected with the sleeve which imparts movement to the throttle, and a spring which tends to unwind said cord and shut off the power.

3. In a combined steering and power-controlling mechanism, the combination substantially as described of a hollow vertical transmission rock-shaft, a steering-arm pivotally connected to the head thereof and adapted to swing in a vertical plane, a grip adapted to rotate on said arm, a spool or block rotatable in the head of the rock-shaft, and an automatic clutch connecting the grip and spool as and for purpose described.

4. In a combined steering and power-controlling device for vehicles, the combination substantially as described, of the hollow transmission rock-shaft, a steering-arm pivotally connected to the head thereof, a grip or handle adapted to rotate on said arm, a spool or block adapted to rotate in the head of the shaft and connected with said rotatable grip, a block guided on the vertical shaft, means for imparting motion thereto by the rotation of the spool in the head of the shaft, and a spring within said shaft connnected to said block for automatically shutting off the power when the operator releases the grip or handle.

5. In a combined steering and controlling device for vehicles, the combination substantially as described, of a hollow vertical shaft 4, and hollow steering-arm 1, pivotally connected to the shaft 4, a rod 2 adapted to rotate in the arm 1, a grip or handle 3, secured to the shaft 2, a spool or block 6 mounted to rotate in the head of the vertical shaft, a sleeve or block 8 guided on said shaft, means for connecting the same with the rotatable spool, and a spring actuating on the block 8 when the grip is released, as and for the purpose described.

Signed at New York, in the county of New York and State of New York, this 26th day of June, A. D. 1901, and 8th day of February, A. D. 1902.

MAJOR DANE PORTER.

Witnesses:
   DELBERT H. DECKER,
   E. L. LAWLER.